March 15, 1955
E. R. TAYLOR
2,704,325
SCANNING PANORAMIC RECEIVER SYSTEM
Filed March 4, 1944
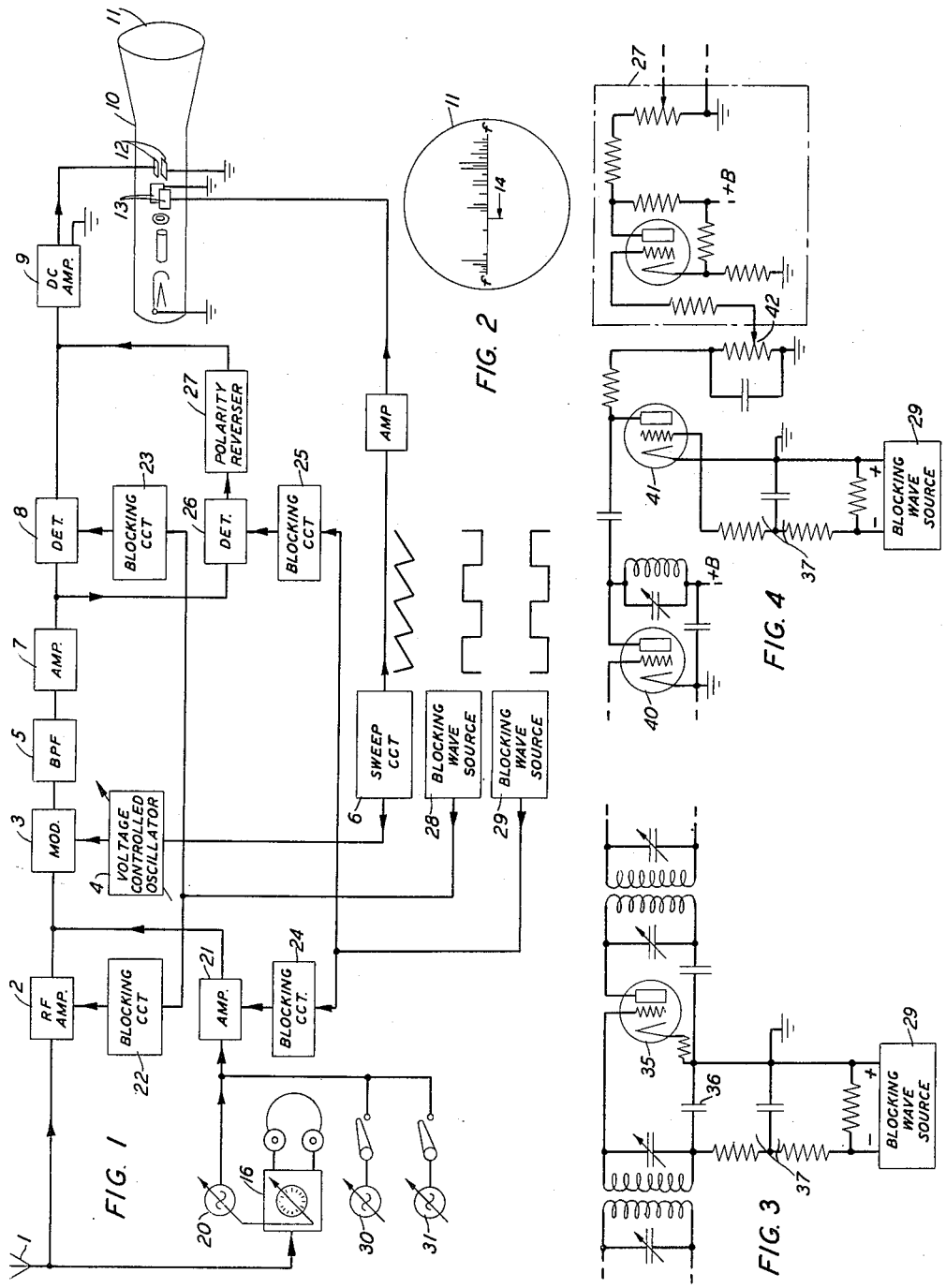
INVENTOR
E. R. TAYLOR
BY
N. S. Ewing
ATTORNEY

| United States Patent Office | 2,704,325
Patented Mar. 15, 1955 |
|---|---|

2,704,325

SCANNING PANORAMIC RECEIVER SYSTEM

Edmund R. Taylor, Pelham Manor, N. Y., assignor to Bell Telephone Laboratories, Incorporated, New York, N. Y., a corporation of New York Application March 4, 1944, Serial No. 525,106

5 Claims. (Cl. 250—20)

This invention relates to scanning systems and more particularly to frequency scanning systems adapted to create a visual representation of the spectrum of the scanned frequency range.

Illustrative of the systems to which the invention relates is a so-called panoramic radio receiving system comprising frequency selective means for cyclically scanning a predetermined radio frequency range and oscilloscopic means for continuously indicating the presence and respective frequencies of all of the radio signals that appear within the frequency range. The signal indications commonly take the form of luminous marks that are positioned according to the respective frequencies of the corresponding signals, along a reference axis or frequency scale on the screen of a cathode ray oscilloscope.

With a view to obtaining an accurate measure of the frequency of a particular indicated signal, and for other purposes, it has been proposed to introduce, together with the signals, locally generated oscillations of accurately known adjustable frequency, and to so adjust the frequency of the oscillations that the luminous mark produced by them coincides with the mark associated with the particular signal. It has been found, however, that as the adjustable "calibrating" mark approaches coincidence with the signal indicating mark both lose sharpness or definition, thereby making it uncertain whether exact coincidence has been established. The difficulty is aggravated too by the fact that when the two marks are coincident they are superposed one on the other.

One of the objects of the present invention is to obviate superposition of the visual indications that are produced in a scanning system, more particularly in a frequency scanning system, by the effects of known and unknown character, respectively. Another object is to obviate the above-mentioned loss of definition that has heretofore been experienced in attempting to establish coincidence between oscillations of adjustable frequency and signal waves concurrently applied to the frequency scanning system.

In accordance with a feature of the present invention, as embodied in a frequency scanning system, signal waves of any given frequency and local oscillations of the same frequency are passed separately through the frequency selective means of the scanner. More specifically, the local oscillations are applied to the scanner only intermittently and exclusively of the received signals.

In accordance with another feature the indication due to the local oscillations is produced in the form of a short luminous line erected on and lying on one side of the frequency axis, while the signal indications are produced as similar lines are erected on and disposed on the opposite side of the axis. One may then judge comparatively accurately whether the line on the one side lies in registry with one of the lines on the other side.

The nature of the present invention and its various features, objects and advantages will appear more fully from a consideration of the embodiment illustrated in the accompanying drawing and hereinafter to be described. In the drawing, Fig. 1 illustrates schematically a panoramic radio receiving system in accordance with the invention;

Fig. 2 illustrates the form in which the visual indications appear; and

Figs. 3 and 4 show certain details of the Fig. 1 system. The system illustrated in Fig. 1 is adapted to maintain a predetermined radio frequency range under substantially continuous observation. In broad outline the system comprises a radio antenna 1 receptive to all waves within the frequency range of interest, a frequency scanner the principal elements of which are numbered 3, 4 and 5, and a cathode ray tube 10 having a luminescent screen 11 on which the received signals produce respective luminous marks spaced along the frequency scale $ff$ in the manner illustrated in Fig. 2. The aforementioned source of local oscillations of adjustable frequency is represented by oscillator 20, and the luminous mark produced by it is indicated at 14 in Fig. 2.

Although various transmission blocking elements are indicated in Fig. 1, they will be disregarded in the first instance in the following detailed description, and account will be taken of their effects later.

Radio receiving antenna 1 is connected to radio frequency amplifier 2, and through the latter all the received waves that lie within the frequency range to be monitored are applied to the input circuit of modulator 3. Beating oscillations are concurrently supplied to modulator 3 from oscillator 4 which is of a type such that its operating frequency can be and is varied under the control of an applied voltage wave. The control wave is a periodic saw-toothed voltage wave produced by sweep circuit 6, and its shape is such that during each cycle the oscillation frequency progresses at substantially linear rate from one limiting value to another, quickly returning to its initial limiting value at the end of the cycle. The sweep circuit 6 may have an operating frequency of 30 cycles per second, for specific example.

In the output circuit of modulator 3 the monitored frequency range appears as a sideband the position of which shifts cyclically between fixed frequency limits at the assumed rate of thirty times a second. The sideband is applied to a band-pass filter 5, and the frequency limits between which the sideband moves are so fixed that the sideband passes, from one extremity to the other, across the pass frequency of filter 5. During each cycle all of the signals within the applied frequency range are therefore presented in succession to filter 5 and they are successively selected thereby. In purpose and effect the selective device, filter 5, cyclically scans or traverses the radio frequency range to be monitored and during each cycle delivers at its output terminals a succession of wave effects derived from the radio signals that are successively encountered.

The wave output of filter 5 is passed through an amplifier 7 and applied to a detector 8 that yields a varying unidirectional voltage more or less proportional to the varying intensity of the waves applied thereto. The derived voltage is applied through direct current amplifier 9 to the deflecting plates 12 of the cathode ray tube 10 for the purpose of controlling the vertical displacement of the luminous spot that is produced by the cathode ray on luminescent screen 11. Horizontal displacement of the spot along the frequency scale is controlled by deflecting plates 13 and the saw-toothed voltage wave that is applied thereto from sweep circuit 6. During each cycle of the saw-toothed wave the spot progresses from one extremity to the other of the frequency scale while the scanner progressively traverses the applied radio frequency range, and then both are quickly set back to their original positions and the process is repeated. During the setting back or retrace period, the cathode ray may be suppressed in well-known manner. By virtue of the structure described all of the signals appearing within the monitored frequency range produce individual luminous marks along the frequency scale, as illustrated in Fig. 2, at points respectively corresponding with their frequencies. Although no actual scale markings need be provided a scale may be inscribed along the reference axis $ff$ if desired.

Oscillator 20 of adjustable frequency is connected through amplifier 21 to the input terminals of modulator 3. The oscillations, like the applied radio signals, are intermittently selected by the frequency scanner, and they tend to produce a luminous mark along the frequency scale at exactly the same position as would an applied signal of the same frequency. Hence if the mark produced by oscillator 20 be adjusted to coincide with the mark produced by a particular signal, the oscillation frequency will be exactly the same as the signal wave frequency. Such being the case the frequency of the particular signal can be determined from the frequency setting of oscillator 20, assuming that the oscillation frequency for each setting is known. The frequency adjustment of oscillator 20 may be electrically or mechanically geared with the tuning of a radio receiver 16 so that the frequency of the source is always exactly equal to the frequency of the signal to which the receiver is tuned. The receiver can then be accurately and quickly tuned to any indicated signal merely by so adjusting oscillator 20 that the luminous mark produced by it coincides with the signal mark of interest. Alternatively or additionally the frequency adjustment of oscillator 20 may be geared with the operating frequency controller of a radio transmitter for the purpose of quickly interfering with transmission of any particular signal appearing on the oscilloscope.

Transmission blocking elements provided in the Fig. 1 system in accordance with the present invention prevent the local oscillations from source 20 and received signals from being applied simultaneously to the band-pass filter 5. More particularly, application of the oscillations to the frequency scanner is blocked except during certain regularly repeated scanning cycles, and during these scanning cycles application of the signal waves to the scanner is blocked. Other synchronously operated blocking elements associated with the output of the scanner isolate the effects that result from the scanning of the oscillations and apply them to the oscilloscope with such polarity as to produce a downwardly directed visual indication 14. In the specific arrangement to be described, the signals and the oscillations are applied, exclusively of each other, in alternate scanning cycles, although with minor changes the oscillations may be applied less frequently if desired.

The transmission blocking functions are controlled and synchronized by wave sources 28 and 29. These sources, which are preferably synchronized with sweep circuit 6, produce square-topped waves of opposite phase as represented by the wave diagram in Fig. 1. In alternate scanning cycles, say the odd-numbered cycles, the waves produced by source 28 operate through blocking circuit 22 to prevent the transmission of signals through amplifier 2. Throughout the same periods the waves operate through blocking circuit 23 to prevent transmission of effects through detector 8. During the other, or even-numbered, scanning cycles the blocking waves supplied by source 29 operate through blocking circuit 24 on amplifier 21 to prevent transmission of the oscillations from source 20 to the scanner, which during these periods receives signals from amplifier 2.

Shunting the path between amplifiers 7 and 9 that is afforded by detector 8, is another path that provides for rectification of the wave output of the scanner and reversal of the polarity of the rectified voltage relative to the polarity of the rectified signal voltages produced by detector 8. This other path is symbolized by detector 26 and polarity reverser 27. Wave source 29 operates through blocking circuit 25 on detector 26 to maintain this path disabled except during the odd-numbered scanning cycles, i. e., the cycles during which oscillator 20 is effectively connected to the scanner. Inasmuch as the polarity of the signal-produced voltages applied to amplifier 9 is opposite to that of the oscillation-produced voltages derived from detector 26, the corresponding luminous marks lie on opposite sides of the frequency axis in the desired manner as illustrated in Fig. 2.

In the operation of the Fig. 1 system, it will be understood, the frequency scanner comprising elements 3, 4 and 5 operates continuously, traversing the frequency range of interest thirty times a second. In alternate scanning cycles the receiving antenna is operatively connected to the scanner, whereby the received waves are scanned fifteen times a second, or often enough that the signal indications appear to the eye to remain continuously on the luminescent screen. In the intervening scanning cycles the local oscillator is operatively connected to the frequency scanner and the wave output of the oscillator is scanned, like the signals but exclusively of them, fifteen times a second, the derived effects producing an apparently continuous luminous mark at a point along the frequency axis corresponding to the oscillation frequency. Since the signals and the local oscillations do not appear simultaneously at any time in modulator 3 or filter 5, neither can distort the effect that the other has on the oscilloscope and impairment of resolution attributed to the concurrent presence of signals and oscillations within the pass band of the filter is completely avoided. In practice it has been found that the oscillator-produced mark can be brought into exact alignment with any signal-produced mark without either mark losing sharpness or definition.

Although reference has been made to only the one oscillation-produced mark 14 a plurality of such marks, separately adjustable, may be made to appear on the screen simultaneously, if desired, by providing a multi-frequency source of local oscillations. Thus, in addition to oscillator 20 there may be provided a plurality of similar oscillators 30, 31 of separately adjustable frequency, each associated with an individual radio receiver, if desired, and each adapted for connection to amplifier 21 at will.

Fig. 3 shows by way of example a specific form that one of the amplifier blocking circuits of the Fig. 1 system may take. The amplifier 21, for example, or one stage thereof, may be of the conventional type comprising double-tuned input and output transformers, with the control grid of the amplifier tube 35 normally biased by a voltage drop developed across a resistor in the common cathode lead. The grid return circuit is by-passed to ground through a condenser 36 that is disposed across the output terminals of a low-pass filter 37, and to the input terminals of the filter is connected the blocking wave source 29. The blocking voltage passed through the filter 37 appears periodically across condenser 36, and while present it increases the negative grid bias to such an extent that the amplifier is disabled. Filter 37 isolates source 29 from the high frequency circuit of the amplifier, so that the latter functions normally during the periods in which the blocking voltage wave is zero.

Fig. 4 illustrates appropriate circuit details of a detector blocking circuit and polarity reverser for the Fig. 1 system. Detector 26, for example, may comprise an amplifier stage 40 and a triode 41 the cathode and anode of which are connected to respective output terminals of the amplifier stage to serve as a diode rectifier. The grid and cathode of triode 41 are so connected, through a low-pass filter 37, to the blocking wave source 29 that the rectifier is biased to cut-off whenever the blocking voltage appears. The output of the rectifier may be taken off by means of an adjustable potential divider 42 and applied to polarity reverser 27. The latter may be, as illustrated in Fig. 4, simply a single-stage direct-current amplifier.

Although the present invention has been described with reference to one specific embodiment, it will be understood that the invention is susceptible of embodiment in other forms within the spirit and scope of the appended claims.

What is claimed is:

1. A panoramic radio receiving system comprising means for receiving radio signals of different frequencies simultaneously, a frequency spectrum scanner comprising frequency-selective means for cyclically traversing a frequency range embracing the said received signals, a local oscillation generator of adjustable frequency, circuit means connecting said signal receiving means and said oscillation generator, individually, to said frequency spectrum scanner, a cathode ray oscilloscope including means for cyclically deflecting the cathode ray in synchronism with the cyclical traverse of said frequency range to establish a frequency axis, a source of periodic waves, means controlled by said periodic waves for disabling one of said circuit means throughout each of regularly recurring intervals, means for disabling the other of said circuit means throughout each of the intervening intervals, means responsive to said signals selected by said frequency spectrum scanner for deflecting said cathode ray from said frequency axis in one direction, and means responsive to said oscillations selected by said frequency spectrum scanner for deflecting said cathode ray from said frequency axis in the opposite direction.

2. A panoramic radio receiving system comprising means for receiving radio signals of different frequencies simultaneously, a frequency spectrum scanner comprising frequency-selective means for cyclically traversing a frequency range embracing the said received signals, a local oscillation generator of adjustable frequency, circuit means connecting said signal receiving means and said oscillation generator, individually, to said frequency spectrum scanner, a cathode ray oscilloscope including means for cyclically deflecting the cathode ray in synchronism with the cyclical traverse of said frequency range to establish a frequency axis, a source of periodic waves, means controlled by said periodic waves for disabling one of said circuit means throughout each of regularly recurring intervals, means for disabling the other of said circuit means throughout each of the intervening intervals, means for deriving a unidirectional voltage of one polarity from said signals selected by said frequency spectrum scanner, means for deriving a unidirectional voltage of opposite polarity from said oscillations selected by said frequency spectrum scanner, and cathode ray deflecting means controlled by said voltages of different polarity.

3. A wave analyzer comprising, in combination with means for receiving electrical waves of different frequencies simultaneously, frequency spectrum scanning means for repeatedly traversing a frequency range embracing said waves and selecting in succession said waves of different frequencies simultaneously present therein, said analyzer including also a generator of oscillations of definite frequency, means connecting said receiving means and said generator to said scanning means alternately in rapid succession, a cathode ray oscilloscope including a luminescent screen and ray deflecting means for establishing a frequency axis thereon, means under the control of said oscillations selected by said scanning means for deflecting the cathode ray in one direction only from said frequency axis, and means under the control of the received said waves selected by said scanning means for deflecting the cathode ray in the opposite direction only from said frequency axis.

4. A wave analyzer in accordance with claim 3 including circuit means connected to said scanning means for deriving from the said received waves selected thereby individually corresponding electrical pulses of a first polarity, circuit means connected to said scanning means for deriving from the said oscillations selected thereby corresponding electrical pulses of opposite polarity, said oscilloscope including a ray deflector operative in response to an electrical pulse applied thereto to deflect the ray in one direction from said axis or in the opposite direction selectively according to the polarity of such an applied pulse, and means common to both of said circuit means for applying the derived pulses of both polarities to said ray deflector.

5. A wave analyzer comprising, in combination with means for receiving electrical waves of different frequencies simultaneously, a local generator of oscillations of adjustable frequency, a cathode ray oscilloscope comprising a luminescent screen and means for repeatedly deflecting the cathode ray along a predetermined reference line to establish a frequency axis, means for selecting the several said received waves in succession repeatedly in timed relation with the deflection of said ray along said reference line, means for likewise separately selecting the said oscillations repeatedly in timed relation with the said deflection of the ray, means for deflecting the said ray from said reference line in a predetermined direction in response to each said selected received wave, and means for deflecting the said ray from said reference line in a different predetermined direction in response to the selected said oscillations.

References Cited in the file of this patent

UNITED STATES PATENTS

| | | |
|---|---|---|
| 2,084,760 | Beverage | June 22, 1937 |
| 2,121,359 | Luck et al. | June 21, 1938 |
| 2,146,862 | Shumard | Feb. 14, 1939 |
| 2,178,074 | Jakel et al. | Oct. 31, 1939 |
| 2,189,549 | Hershberger | Feb. 6, 1940 |
| 2,208,378 | Luck | July 16, 1940 |
| 2,221,115 | Shepard | Nov. 12, 1940 |
| 2,233,275 | Wolf | Feb. 25, 1941 |
| 2,279,151 | Wallace | Apr. 7, 1942 |
| 2,279,246 | Podliasky et al. | Apr. 7, 1942 |
| 2,300,999 | Williams | Nov. 3, 1942 |
| 2,361,956 | Moseley | Nov. 7, 1944 |
| 2,418,139 | Preisman | Apr. 1, 1947 |
| 2,419,541 | De Rosa | Apr. 29, 1947 |